(12) United States Patent
Trudeau et al.

(10) Patent No.: US 10,009,626 B2
(45) Date of Patent: Jun. 26, 2018

(54) METHOD AND SYSTEM FOR RATE-CONSTRAINED SEARCH ORDERING

(71) Applicant: ECOLE DE TECHNOLOGIE SUPERIEURE, Montreal (CA)

(72) Inventors: Luc Normand Trudeau, Saint-Bruno-de-Montarville (CA); Stéphane Coulombe, Brossard (CA); Christian Desrosiers, Montreal (CA)

(73) Assignee: ECOLE DE TECHNOLOGIE SUPERIEURE, Montreal (CA)

( * ) Notice: Subject to any disclaimer, the term of this patent is extended or adjusted under 35 U.S.C. 154(b) by 246 days.

(21) Appl. No.: 14/609,324

(22) Filed: Jan. 29, 2015

(65) Prior Publication Data
US 2015/0215637 A1 Jul. 30, 2015

Related U.S. Application Data

(60) Provisional application No. 61/932,997, filed on Jan. 29, 2014.

(51) Int. Cl.
*H04B 1/66* (2006.01)
*H04N 19/567* (2014.01)
*H04N 19/533* (2014.01)

(52) U.S. Cl.
CPC ......... *H04N 19/567* (2014.11); *H04N 19/533* (2014.11)

(58) Field of Classification Search
CPC ............................ H04N 19/567; H04N 19/533
See application file for complete search history.

(56) References Cited

U.S. PATENT DOCUMENTS 5,504,530 A * 4/1996 Obikane .............. H04N 19/176
　　　　　　　　　　　　　　　　　　　　　　　　　348/699
5,715,016 A * 2/1998 Kobayashi .............. G06T 7/202
　　　　　　　　　　　　　　　　　　　　　　　　　348/402.1

(Continued)

FOREIGN PATENT DOCUMENTS

CA　　　　2885501　　　　9/2015

OTHER PUBLICATIONS

G. J. Sullivan, J.-R. Ohm, W.-J. Han, T. Wiegand, Overview of the High Efficiency Video Coding (HEVC) Standard, IEEE Transactions on Circuits and Systems for Video Technology, Dec. 2012, pp. 1649-1668, vol. 22, No. 12, http://ieeexplore.ieee.org/xpls/abs_all.jsp?arnumber=6316136.

(Continued)

*Primary Examiner* — Tat C Chio
(74) *Attorney, Agent, or Firm* — IP-MEX Inc.; Victoria Donnelly (57) ABSTRACT

Methods and systems for rate-constrained search ordering algorithms for reducing computational cost of motion estimation in video coding have been provided. Conventional search orderings, such as spiral search, can weaken the filtering criterion of rate-constrained successive elimination algorithms. Simulation results provided herein above demonstrate that, on average, the amount of SAD (sum of absolute differences) operations required to encode the tested sequences, is reduced using embodiments of the invention, when compared to the conventional implementations of spiral search for example. Advantageously, for sequences with unpredictable motion, this reduction may be greater than 5%, and may even exceed 10% when smaller block partitions are evaluated.

20 Claims, 9 Drawing Sheets

(56) References Cited

U.S. PATENT DOCUMENTS

| | | | |
|---|---|---|---|
| 6,983,018 B1 | 1/2006 | Lin | |
| 2003/0026335 A1* | 2/2003 | Thyagarajan | G06T 9/007 375/240.2 |
| 2005/0243926 A1 | 11/2005 | Hubrich | |
| 2006/0262848 A1* | 11/2006 | Togita | H04N 19/61 375/240.03 |
| 2007/0127575 A1* | 6/2007 | Ho | H04N 19/56 375/240.16 |
| 2007/0286286 A1 | 12/2007 | Heng | |
| 2009/0327611 A1* | 12/2009 | Fang | G06F 12/0864 711/128 |
| 2011/0200112 A1 | 8/2011 | Won | |
| 2013/0016788 A1 | 1/2013 | Oh | |
| 2013/0121401 A1 | 5/2013 | Zheludkov | |

OTHER PUBLICATIONS

ISO/IEC JTC 1/SC 29/WG 11, High Efficiency Video Coding, ITU-T H.265 Recommendation, Rev. 1.0, Apr. 2013.

ITU-T SG16 Q.6 and ISO/IEC JTC 1/SC 29/WG 11, Advanced Video Coding For Generic Audiovisual Services, ITU-T H.264 Recommendation, Rev. 1.0, May 2003.

A. Tourapis, O. Au, M. Liou, Predictive Motion Vector Field Adaptive Search Technique (PMVFAST): Enhancing Block-Based Motion Estimation, SPIE Visual Communications and Image Processing, Dec. 2000, pp. 883-892, vol. 4310, http://dx.doi.org/10.1117/12.411871.

A. Tourapis, Enhanced Predictive Zonal Search for Single and Multiple Frame Motion Estimation, SPIE Visual Communications and Image Processing, Jan. 2002, pp. 1069-1079, vol. 4671, http://dx.doi.org/10.1117/12.453031.

W. Li, E. Salari, Successive Elimination Algorithm For Motion Estimation, IEEE Transactions on Image Processing, Jan. 1995, pp. 105-107, vol. 4, No. 1, http://www.ncbi.nlm.nih.gov/pubmed/18255420.

X. Gao, C. J. Duanmu, C. Zou, A Multilevel Successive Elimination Algorithm for Block Matching Motion Estimation, IEEE Transactions on Image Processing, Mar. 2000, pp. 501-504, vol. 9, No. 3, http://www.ncbi.nlm.nih.gov/pubmed/18255420.

C. Zhu, W.-S. Qi, W. Ser, Predictive Fine Granularity Successive Elimination For Fast Optimal Block-Matching Motion Estimation, IEEE Transactions on Image Processing, Feb. 2005, pp. 213-221, vol. 14, No. 2.

M. Coban, R. Mersereau, A Fast Exhaustive Search Algorithm for Rate-Constrained Motion Estimation, IEEE Transactions on Image Processing, May 1998, pp. 769-773, vol. 7, No. 5, http://www.ncbi.nlm.nih.gov/pubmed/18276290.

K. McCann, B. Bross, W. Han, I. Kim, JCTVC-O1002 High Efficiency Video Coding (HEVC) Test Model 13 (HM 13) Encoder Description, JCT-VC, Tech. Rep, Oct. 2013.

M. Yang, H. Cui, K. Tang, Efficient Tree Structured Motion Estimation Using Successive Elimination, Vision, Image and Signal Processing, IEE Proceedings, Oct. 2004, pp. 369-377, vol. 151, No. 5.

L. Trudeau, S. Coulombe, C. Desrosiers, Rate Distortion-Based Motion Estimation Search Ordering for Rate-Constrained Successive Elimination Algorithms, 2014 IEEE International Conference on Image Processing (ICIP 2014), Oct. 2014, pp. 3175-3179, Paris, France.

T. Toivonen, J. Heikkila, Fast Full Search Block Motion Estimation for H.264/AVC With Multilevel Successive Elimination Algorithm, 2004 IEEE International Conference on Image Processing (ICIP 2004), Oct. 2004, pp. 1485-1488, Singapore.

ISO/IEC JTC 1/SC 29/WG 11, High Efficiency Video Coding, ITU-T H.265 Recommendation, Rev. 1.0, Apr. 2015.

ITU-T SG16 Q.6 and ISO/IEC JTC 1/SC 29/WG 11, Advanced video coding for generic audiovisual services, ITU-T H.264 Recommendation, Rev. 1.0, Feb. 2014.

* cited by examiner

METHOD AND SYSTEM FOR RATE-CONSTRAINED SEARCH ORDERING

REFERENCE TO RELATED APPLICATIONS

This application claims an invention which was disclosed in Provisional Application No. 61/932,997 filed Jan. 29, 2014 entitled "METHOD AND SYSTEM FOR RATE-CONSTRAINED SEARCH ORDERING". The benefit under 35 USC § 119(e) of the United States provisional application is hereby claimed, and the entire contents of the aforementioned provisional application is hereby incorporated herein by reference.

TECHNICAL FIELD

The present invention relates to a method and system for the encoding of video images and, in particular, to methods and systems of rate-constrained search ordering algorithms for the motion estimation process of encoding video images.

BACKGROUND

Motion estimation is a predominant task of most modern video encoders. In the H.264 video encoding standard (T. Wiegand, G. J. Sullivan, G. Bjontegaard, and A. Luthra, "Overview of the H.264/AVC video coding standard," *Circuits and Systems for Video Technology, IEEE Transactions on*, vol. 13, no. 7, pp. 560-576, 2003), when motion estimation is used to encode a frame, it is performed on every non-overlapping 16×16 block called current macroblock (in general, a block of 16×16 pixels is called a macroblock). Motion estimation is also performed inside each current macroblock, for block partitions of sizes 16×16, 16×8, 8×16, 8×8, 8×4, 4×8, 4×4. These block partitions, or blocks, are called current blocks. Motion estimation consists of finding an optimal matching block matching candidate in a search area of size (2W+1)×(2W+1), where W is the full pel (picture element) length of the search area. The blocks inside this search area are called candidate blocks, and the search area can span over multiple reference frames, and quarter pel precision is used.

An exhaustive search algorithm (ESA) will obtain an optimal match by evaluating a cost function for each candidate block inside the search area. The best match, or optimal match, is the candidate with the lowest cost function value. The high computational complexity incurred by evaluating the cost function for all possible candidate blocks allowed in H.264 limits practical applications of ESA in modern encoders. Many algorithms reduce this computational complexity, and can be classified by whether or not they preserve optimality. Algorithms that do not preserve optimality often rely on the assumption of a monotonically increasing match criterion around the location of the optimal candidate block. When this assumption does not hold, accuracy of the motion estimation is reduced, as it will converge to a local minimum. Modern algorithms in this class include zonal search algorithms (A. M. Tourapis, O. C. Au, and M. L. Liou, "Predictive motion vector field adaptive search technique (PMVFAST): enhancing block-based motion estimation," *Proc. SPIE Visual Communications and Image Processing*, vol. 4310, pp. 883-892, 2001; and A. M. Tourapis, "Enhanced predictive zonal search for single and multiple frame motion estimation," *Proc. SPIE Visual Communications and Image Processing*, vol. 4671, pp. 1069-1079, 2002), which first evaluate a set of predictors in order to constrain a local diamond or square search to a very narrow zone of the search area.

Optimality preserving algorithms often rely on known inequalities, to avoid computing the cost function of candidate blocks during the search process. Recent algorithms in this class append more efficient filtering criteria to the successive elimination algorithm (SEA) (W. Li and E. Salari, "Successive elimination algorithm for motion estimation.," *IEEE Transactions on Image Processing*, vol. 4, no. 1, pp. 105-7, January 1995, hereinafter Li). Others (X. Q. Gao, C. J. Duanmu, and C. R. Zou, "A multilevel successive elimination algorithm for block matching motion estimation.," *IEEE Transactions on Image Processing*, vol. 9, no. 3, pp. 501-504, March 2000, hereinafter Gao; and C. Zhu, W.-S. Qi, and W. Ser, "Predictive fine granularity successive elimination for fast optimal block-matching motion estimation.," *IEEE Transactions on Image Processing*, vol. 14, no. 2, pp. 213-221, February 2005, hereinafter Zhu), in their own way propose the use of partitions inside blocks to improve filtering efficiency.

Others (M. Z. Coban and R. M. Mersereau, "A fast exhaustive search algorithm for rate-constrained motion estimation.," *IEEE Transactions on Image Processing*, vol. 7, no. 5, pp. 769-773, May 1998, hereinafter Coban) modified the SEA to take into account the number of bits required to encode the motion vector of a candidate block, by altering the SEA criterion into a rate-constrained filtering criterion. This alteration is in line with the H.264 standard recommendations (K. P. Lim, G. J. Sullivan, and T. Wiegand, "Text description of joint model reference encoding methods and decoding concealment methods," *JVT-R095, JVT of ISO/IEC MPEG and ITU-T*, January 2006, hereinafter Lim) that the optimal matching candidate block should be the best rate-constrained match. H.264-based SEA algorithms have been proposed (M. Yang, H. Cui, and K. Tang, "Efficient tree structured motion estimation using successive elimination," *IEE Proceedings Vision, Image and Signal Processing*, vol. 151, no. 5, pp. 369-377, October 2004, hereinafter Yang; and T. Toivonen and J. Heikkila, "Fast full search block motion estimation for H.264/AVC with multilevel successive elimination algorithm," in *ICIP '04. International Conference on Image Processing*, October 2004, vol. 3, pp. 1485-1488, hereinafter Toivonen).

Another way the filtering criterion can be improved is via the candidate block search ordering used for motion estimation. Spiral search ordering is known to outperform a raster search ordering, and tends to evaluate better candidate blocks earlier in the search process, which in turn improves the filtering criterion and allows more candidate blocks to be skipped. That is why the spiral search ordering is used in many implementations of SEA-based algorithms (Zhu, Coban, and Yang). This must however not to be confused with SpiralPDE (J. N. Kim and T. S. Choi, "A fast full-search motion-estimation algorithm using representative pixels and adaptive matching scan," *IEEE Transactions on Circuits and Systems for Video Technology*, vol. 10, no. 7, pp. 1040-1048, October 2000), which is a spiral pattern used to sum the elements of a block.

However, conventional search algorithms such as raster and spiral search algorithms discussed hereinabove, can impair the filtering criterion of rate-constrained successive elimination algorithms. It would be advantageous to provide a method and system for overcoming this problem.

BRIEF DESCRIPTION OF THE DRAWINGS

Further features and advantages of the invention will be apparent from the following description of the embodiment, which is described by way of example only and with reference to the accompanying drawings, in which.

SUMMARY OF THE INVENTION

The present invention is directed to methods and systems of search ordering algorithms for the motion estimation process of encoding video images.

According to one aspect of the invention there is provided a method for rate-constrained search ordering of candidate blocks in a motion estimation process of a video encoder, including: determining vector encoding costs for respective motion vectors corresponding to candidate blocks in a video frame; and assigning an order for evaluating a rate-constrained cost of each candidate block based on the determined vector encoding costs.

In some embodiments the method further includes determining a series of search positions for the candidate blocks in a rate-constrained search ordering data structure, having the assigned order.

In some embodiments each search position in the series of search positions has a corresponding vector encoding cost greater than or equal to a previous search position in the series of search positions. The series of search positions are often referred constitute a search ordering.

In some embodiments the rate-constrained search ordering data structure is a table. The table is often referred as search ordering table.

In some embodiments the determining the series of search positions further includes: determining a section of the rate-constrained search ordering data structure for each of the candidate blocks; and determining the order of the series of search positions according to a respective section of each of the candidate blocks.

In some embodiments each section of the rate-constrained search ordering data structure is a quadrant.

In some embodiments the determining the order of the series of search positions comprises determining a search order that alternates between the quadrants.

In some embodiments the determining the vector encoding costs of each respective motion vector comprises determining a number of bits required to code components of respective motion vectors.

In some embodiments the determining of the number of bits required to code components of the respective motion vectors comprises determining the number of bits using a variable length code.

In some embodiments the variable length code is an exponential code.

In some embodiments the variable length code is an arithmetic code.

In some embodiments the exponential code is an exponential Golomb code.

In some embodiments an estimate of the bits required to code components of the motion vectors is used.

In accordance with another aspect of the invention there is provided a system for rate-constrained search ordering of candidate blocks in a motion estimation process of a video encoder, the system including: a computer readable storage medium having computer readable instructions stored thereon for execution by a processor, causing the processor to determine vector encoding costs for respective motion vectors corresponding to candidate blocks in a video frame; and assign an order for evaluating a rate-constrained cost of each candidate block based on the determined vector encoding costs.

In some embodiments the system further includes computer readable instructions causing the processor to determine a series of search positions for the candidate blocks in a rate-constrained search ordering data structure, having the assigned order.

In some embodiments of the system each search position in the series of search positions has a corresponding vector encoding cost greater than or equal to a previous search position in the series of search positions.

In some embodiments of the system the rate-constrained search ordering data structure is a table.

In some embodiments of the system the computer readable instructions causing the processor to determine the series of search positions further includes: computer readable instructions causing the processor to determine a section of the rate-constrained search ordering data structure for each of the candidate blocks; and computer readable instructions causing the processor to determine the order of the series of search positions according to a respective section of each of the candidate blocks.

In some embodiments of the system each section of the rate-constrained search ordering data structure is a quadrant.

In some embodiments the system can stop processing the series of search positions when the vector encoding cost is greater or equal than the current best cost value.

In some embodiments of the system the computer readable instructions causing the processor to determine the order of the series of search positions comprises computer readable instructions causing the processor to determine a search order that alternates between the quadrants.

In some embodiments of the system the computer readable instructions causing the processor to determine the vector encoding costs of each respective motion vector comprises computer readable instructions causing the processor to determine a number of bits required to code components of respective motion vectors.

In some embodiments of the system the computer readable instructions causing the processor to determine the number of bits required to code components of the respective motion vectors comprises computer readable instructions causing the processor to determine the number of bits using an exponential code.

In some embodiments of the system the exponential code is an exponential Golomb code.

The accompanying drawings are included to provide a further understanding of the present invention and are incorporated in and constitute a part of this specification. The drawings illustrate some embodiments of the invention and together with the description serve to explain the principles of the invention. Other embodiments of the invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION OF EMBODIMENTS OF THE INVENTION

The present invention provides a class of candidate block search ordering algorithms, referred to herein as rate-constrained search ordering algorithms. In the following discussion it is demonstrated that conventional search ordering algorithms, such as raster and spiral search, can impair the filtering criterion of rate-constrained successive elimination algorithms. Rate-constrained search ordering algorithms do not exhibit this property, making them ideal for rate distortion contexts such as, for example, H.264 encoding.

This description is organized as follows: first, rate-constrained successive elimination is described, and then the motivations for rate-constrained search orderings are explained. Next, the rate-constrained search ordering algorithm is described. Then, experimental results for various sequences and discussions of the results are given. Finally, example embodiments of the invention are described with reference to the drawings.

Rate-Constrained Successive Elimination Algorithms

Successive Elimination Algorithms (SEA) are based on the following inequality (Li):

$$|B-C(x_i,y_i)| \leq SAD(x_i,y_i), \quad (1)$$

where B is sum of the current block pixel values and $C(x_i, y_i)$ is the sum of the pixel values of the ith candidate block located at position $(x_i, y_i)$ in the search area. On the right hand side, the $SAD(x_i, y_i)$ function returns the sum of the absolute differences between the pixel values of the current block and those of the ith candidate block.

At first glance, the complexity of computing B and $C(x_i, y_i)$ might seem equivalent to that of computing the $SAD(x_i, y_i)$ function, but that is not the case, since Li also proposed an apriori fast block summation technique. During motion estimation, the values of B and $C(x_i, y_i)$ are obtained with table lookups, as shown on lines 3 and 11 of Algorithm 1. As explained in Li, the overhead of precalculating these sums is negligible and, overall, reduces computational costs by 85% when compared to ESA.

The filtering criterion works in the following manner: for a given candidate block, if the left-hand side of equation (1), a lower bound for its SAD value, is higher than the current best SAD value of the search area, then this candidate is not optimal. Therefore, the current best SAD value is used as a threshold to decide when to avoid computing the SAD function.

The Rate-Constrained Successive Elimination Algorithms, originally proposed by Coban, states that to be optimal, the ith candidate block must satisfy the following inequality:

$$|B-C(x_i,y_i)|+\lambda R(x_i,y_i) \leq SAD(x_{i-1}^*,y_{i-1}^*)+ \lambda R(x_{i-1}^*,y_{i-1}^*), \quad (2)$$

where $\lambda$ is the Lagrange multiplier, a trade-off between rate and distortion. Often referred to as rate, the R(x, y) function returns the number of bits required to encode the motion vector of the candidate block at position (x, y). The term $(x_i^*, y_i^*)$ is the current best candidate block, having considered the candidate blocks from 0 to i−1 in the scan ordering, and is such that:

$$\forall n \in \{0, \ldots, i\}(SAD(x_i^*,y_i^*)+\lambda R(x_i^*,y_i^*) \leq SAD(x_n,y_n)+\lambda R(x_n,y_n)). \quad (3)$$

It is important to note that the best candidate is no longer the lowest SAD value, but the best rate-constrained SAD value. Note that equation (2) is a necessary but not sufficient condition for the ith candidate block to be optimal and allows discarding (filtering) candidates that cannot be optimal.

Algorithm 1 details the implementation of a motion estimation algorithm enhanced with a rate-constrained successive elimination algorithm.

Algorithm 1 Motion estimation algorithm enhanced with the rate-constrained successive elimination algorithm.

```
1:  function MOTIONESTIMATION(block, minCost)
2:      i* ← −1   ▷ negative when no better candidate is found
3:      B ← sumB[block.x][block.y]
4:      for i ← 0 to numCand do
5:          x ← ordering[i].x
6:          y ← ordering[i].y
7:          cost ← λ × R(x, y)
8:          if cost ≥ minCost then
9:              return minCost, i*
10:         end if
11:         C ← sumC[block.x + x][block.y + y]
12:         if |B − C| < minCost − cost then
13:             cost ← cost + SAD(x, y)
14:             if cost < minCost then
15:                 minCost ← cost
16:                 i* ← i
17:             end if
18:         end if
19:     end for
20:     return minCost, i*
21: end function
```

More precisely, sumB and sumC are lookup tables for the precalculated block sums, ordering is a lookup table for candidate block ordering and minCost is the cost value of the current best candidate block. The filtering operation occurs on line 12, thus allowing the SAD function to be skipped if the condition in (2) is not met.

One of the issues tackled by Coban is finding the optimal value of $\lambda$. This is somewhat resolved by the H.264 standard recommendations (Lim), as the recommended value of $\lambda$ can be obtained with the following equation:

$$\lambda_{MOTION} = \left(w \times 2^{\left(\frac{QP-12}{3}\right)}\right), \quad (4)$$

where w varies from 0.65 to 0.85, depending on the type of frame that is being encoded. This is somewhat a solution to the problem, but is in no way the optimal value of $\lambda$.

Equation (2) can be written as follows:

$$|B-C(x_i,y_i)| \leq SAD(x_{i-1}^*,y_{i-1}^*)+\lambda(R(x_{i-1}^*,y_{i-1}^*)-R(x_i,y_i)). \quad (5)$$

This form of the equation is interesting because of the difference between $R(x_i^*, y_i^*)$ and $R(x_i, y_i)$. Let $\Delta R_i$ be the result of this differentiation for the i-th candidate block, $$\Delta R_i = R(x_i^*,y_i^*) - R(x_i,y_i). \quad (6)$$

If $\Delta R_i$ is positive, then this will increase the filtering threshold in (5) by $\lambda \times \Delta R_i$ and thus weaken the rate-constrained on the filtering criterion. This often occur both in raster and spiral search ordering.

In the next section, a class of search ordering algorithms that do not weaken the rate-constrained filtering criterion is presented.

Rate-Constrained Search Ordering Algorithms

In light of the fact that the search ordering of candidate blocks can weaken a rate-constrained filtering criterion, embodiments of the invention provide a class of candidate block search ordering algorithms, known as rate-constrained search ordering algorithms. To be classified as such, the ordering of the candidate blocks must adhere to the following rule: the motion vector encoding cost of the current candidate block must be equal to or greater than the preceding candidate block, $$R(x_i, y_i) \geq R(x_{i-1}, y_{i-1}). \quad (7)$$

This guarantees that $\Delta R_i \leq 0$, thus never weakening the rate-constraint on the filtering criterion.

However, this class of search ordering algorithms is dependent on the encoding scheme used for the motion vectors of candidate blocks. For the H.264 standard, each component of a motion vector is coded using exponential Golomb codes and quarter pixel precision, and thus $$R(x, y) = G(4x) + G(4y), \quad (8)$$

where the G function returns the number of bits required to code a given value with an exponential Golomb code. This function can be defined as follows:

$$G(x) = 2 \times \lfloor \log_2(2|x|+1) \rfloor + 1. \quad (9)$$

In the HEVC standard (ISO/IEC JTC 1/SC 29/WG 11, High efficiency video coding, ITU-T H.265 Recommendation, Rev. 1.0, 2013.), the bit length of the exponential Golomb code is recommended as a fast estimate of the motion vector cost for the rate-constrained motion estimation algorithm, as implemented in the HEVC reference software (K. McCann, B. Bross, W. Han, and I. Kim, "JCTVC01002 High Efficiency Video Coding (HEVC) test model 13 (HM 13) encoder description," JCT-VC, Tech. Rep, no. November, 2013.). Therefore, the methods proposed in this document apply to HEVC as well as H.264 and may be applied to other video standards as well.

In general, the determining of the number of bits required to code components of the respective motion vectors includes determining the number of bits using a variable length code. The variable length code is preferably an exponential code or alternatively may be an arithmetic code. In some embodiments the exponential code is an exponential Golomb code.

In some embodiments an estimate of the bits required to code components of the motion vectors is used.

Figure 7:
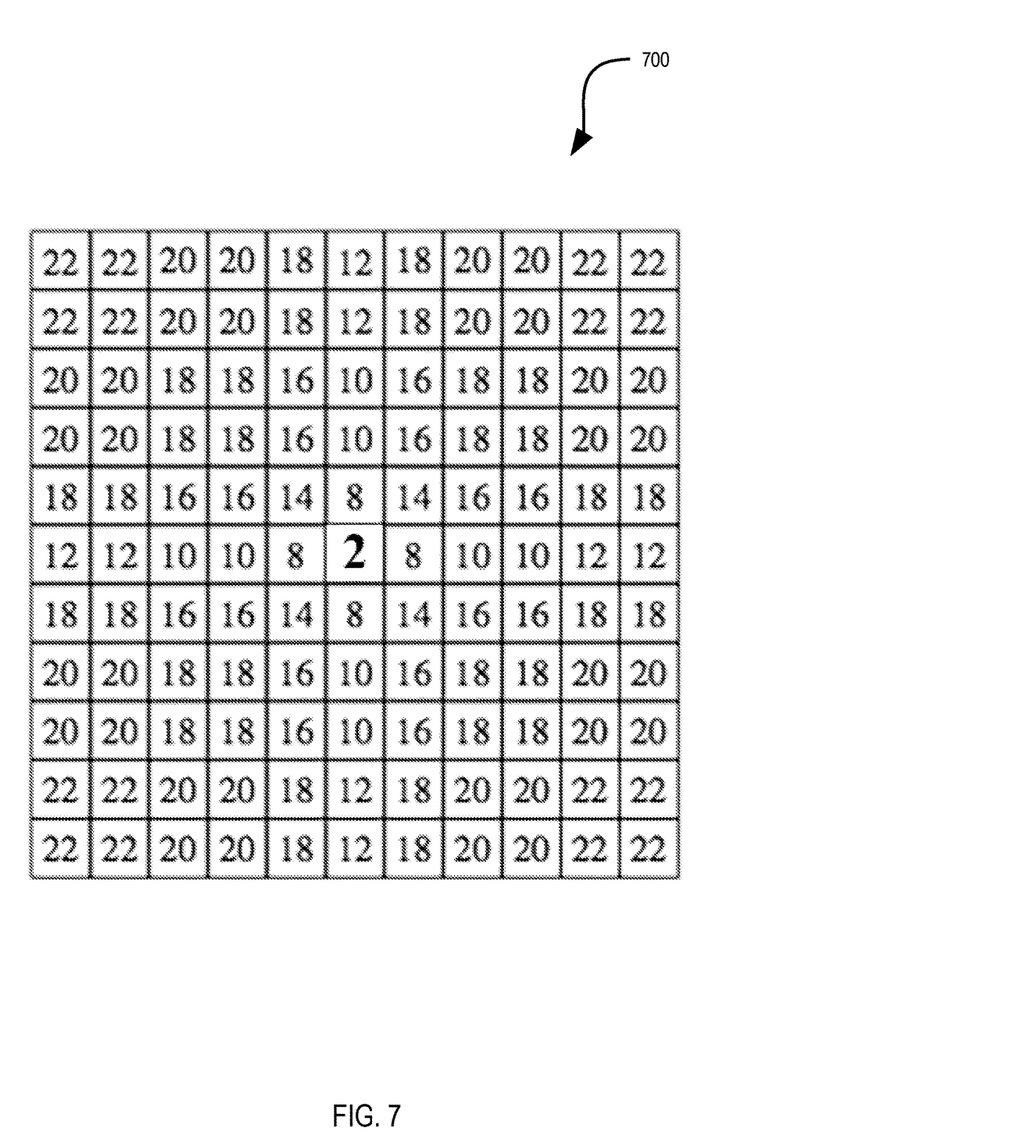
FIG. 7 is a block diagram of a grid of motion vector bit lengths for the candidate blocks of a search area.

In FIG. 7, there is presented the motion vector encoding costs of candidate blocks for a very small part of an H.264 motion estimation search area centered on the H.264 predicted motion vector. Analyzing these costs, note that for the same distance from the center (0,0), candidate blocks located near the diagonal ($x_i \approx y_i$) are more expensive than those near the axis ($x_i \neq y_i$).

This helps to explain how the spiral search can weaken the rate-constrained filtering criterion. If the current best candidate is close to or on the diagonal, then the evaluation of candidate blocks closer to the axes will result in a positive value for $\Delta R_i$, weakening the filtering criterion.

Figure 8A:
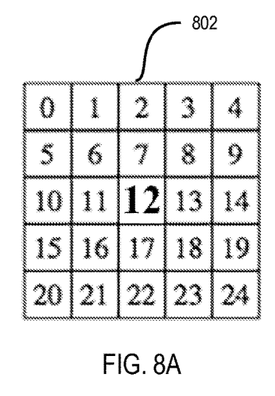
FIG. 8A is a block diagram of a grid of raster search ordering.
Figure 8B:
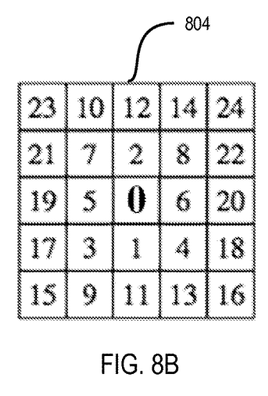
FIG. 8B is a block diagram of a grid of H.264 spiral search ordering.

Applying the rule defined by equation (7) to the grid of FIG. 7 can result in multiple search orderings. In this description, a search ordering that successively evaluates different quadrants around the center (0,0) is provided. Grids, in FIGS. 8B and 8C, show 5×5 subsets of the 65×65 grids tested in the next section.

Figure 8C:
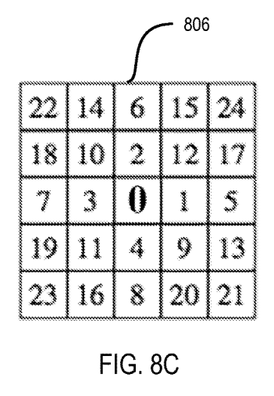
FIG. 8C is a block diagram of a grid of rate-constrained search ordering in accordance with an embodiment of the invention.

Note that in the grid, FIG. 8C, the axes are evaluated first, since their motion vectors require fewer bits. Next, the points closest to the center and the axes are evaluated (similar to an asymptote shape). It is chosen to alternate between quadrants, since this is also performed in the H.264 JM implementation of spiral search (FIG. 8B). Alternating between quadrants can improve filtering, when a better candidate is found sooner, which will allow more SAD operations to be skipped.

Another interesting feature of this class of search orderings is the possibility of early termination. Ordering the candidate blocks of the search area by motion vector cost allows the use of the following inequality:

$$\lambda R(x_i, y_i) \geq SAD(x_{i-1}^*, y_{i-1}^*) + \lambda R(x_{i-1}^*, y_{i-1}^*) \quad (10)$$

Once for candidate i the rate multiplied by the Lagrange Multiplier, is greater than the current best rate-constrained SAD value, no better solution will be found with any other candidate j>i. This is implemented on line 8 of Algorithm 1.

Implementing a new search candidate ordering in an encoder like the H.264 joint model (Joint Video Team (JVT) of ISO/IEC MPEG & ITU-T VCEG, "H.264/AVC JM Reference Software," http://iphome.hhi.de/suehring/tml/, May 2013, version 18.5, hereinafter JVT) is relatively straightforward and involves few implementation requirements, as a grid of values, analogous to the ordering lookup table in Algorithm 1, is used for spiral scan ordering. Embodiments of the present invention only requires changing the pointer to this grid. This change allows for advantageous results, as will be shown in the next section.

Experimental Results and Discussion

In order to compare the rate-constrained search ordering algorithm to the spiral search ordering algorithm, the search ordering is implemented into the H.264/AVC JM 18.5 reference software (JVT). The number of SAD operations required to encode CIF (352×288) sequences using the reference software's spiral search implementation against the rate-constrained search ordering algorithm was compared. To simplify results, the baseline profile is used with the following alterations: 5 reference frames, full pixel precision motion estimation and only 16×16, 8×8 and 4×4 block partitions. Similar results are expected with rectangular shaped blocks.

TABLE 1

SAD reduction using the proposed search ordering compared to the H.264 JM reference software's implementation of spiral search, as a function of block size and QP for several CIF video sequences.

| | | Foreman (# of SAD operations) | | | Football (# of SAD operations) | | | News (# of SAD operations) | | |
|---|---|---|---|---|---|---|---|---|---|---|
| QP | Size | Spiral | Proposed | Red. % | Spiral | Proposed | Red. % | Spiral | Proposed | Red. % |
| 28 | 4 | 416262070 | 388993410 | 6.55% | 1115661675 | 1035142134 | 7.22% | 134537882 | 128099468 | 4.79% |
| 28 | 8 | 785227992 | 765544865 | 2.51% | 1955919279 | 1882526019 | 3.75% | 290136328 | 286173266 | 1.37% |
| 28 | 16 | 409325310 | 401608855 | 1.89% | 903904793 | 879156973 | 2.74% | 309741039 | 308103709 | 0.53% |

TABLE 1-continued

SAD reduction using the proposed search ordering compared to the H.264 JM reference software's implementation of spiral search, as a function of block size and QP for several CIF video sequences.

| | | Foreman (# of SAD operations) | | | Football (# of SAD operations) | | | News (# of SAD operations) | | |
|---|---|---|---|---|---|---|---|---|---|---|
| QP | Size | Spiral | Proposed | Red. % | Spiral | Proposed | Red. % | Spiral | Proposed | Red. % |
| 32 | 4 | 225442778 | 204861411 | 9.13% | 698105494 | 638767242 | 8.50% | 81710975 | 76734942 | 6.09% |
| 32 | 8 | 648570481 | 627984818 | 3.17% | 1659309376 | 1594498115 | 3.91% | 255001256 | 249897228 | 2.00% |
| 32 | 16 | 422019606 | 414160704 | 1.86% | 922208528 | 898298829 | 2.59% | 291083798 | 289592570 | 0.51% |
| 36 | 4 | 107804660 | 95285467 | 11.61% | 393409060 | 353080194 | 10.25% | 44836321 | 41544099 | 7.34% |
| 36 | 8 | 529033021 | 507752081 | 4.02% | 1185610980 | 1133690522 | 4.38% | 215288507 | 212294102 | 1.39% |
| 36 | 16 | 426912515 | 419050593 | 1.84% | 923795311 | 900217448 | 2.55% | 270475527 | 269005875 | 0.54% |
| 40 | 4 | 47435348 | 41836990 | 11.80% | 183815418 | 161532698 | 12.12% | 24308026 | 22453474 | 7.63% |
| 40 | 8 | 405457244 | 383738455 | 5.36% | 760172034 | 712290223 | 6.30% | 166808837 | 163627932 | 1.91% |
| 40 | 16 | 421173116 | 413071553 | 1.92% | 876436298 | 856138643 | 2.32% | 264566993 | 263016343 | 0.59% |
| | | Average SAD reduction | | 5.14% | Average SAD reduction | | 5.55% | Average SAD reduction | | 2.89% |

The number of SAD operations required for "Foreman", "Football" and "News" sequences are listed in detail in Table 1. Table 2 lists the average reduction percentage of SAD operations for the "Foreman", "Flower", "Football", "Mobile", "News" and "Tempete" sequences. In this table, the column Δ Bits (kb/s) is the average bit rate difference, measured in kilobits per second, between the spiral search ordering encoding and the rate-constrained search ordering encoding. The difference is very small, and is attributable to the search ordering algorithms finding different best candidates, but with the same cost values. This phenomenon has a low probability, but considering the number of candidate blocks evaluated, it does occur. This leads to an even smaller average difference in luma PSNR, listed in the Δ PSNR-Y column. For the Δ columns, a negative value indicates that the value, resulting from the encoding of the rate-constrained search ordering, is smaller than that obtained by the spiral search encoding.

TABLE 2

Average results for spiral search ordering versus proposed search ordering, with the same experimental conditions as Table 1.

| Sequence | SAD Red. | Δ Bits (kb/s) | Δ PSNR-Y |
|---|---|---|---|
| Foreman | 5.14% | −0.18 | 0.0000 |
| Flower | 1.61% | −0.21 | −0.0017 |
| Football | 5.55% | 0.09 | −0.0025 |
| Mobile | 0.80% | −0.18 | 0.0008 |
| News | 2.89% | −0.04 | 0.0017 |
| Tempete | 1.14% | −0.11 | 0.0008 |
| Average | 2.86% | −0.10 | −0.0001 |

From the results in Table 1, note that the rate-constrained search ordering algorithm is more effective for smaller partition sizes. This is due to the higher ratio of bits required for the motion vector of the candidate block versus its SAD value. When this ratio increases, the weakening effect of the rate-constraint on the filtering criterion caused by the spiral search is more significant. A similar situation arises when the QP increases, which leads to an increase in the value of $\lambda_{MOTION}$ which is multiplied by $\Delta R_i$, see equation (5).

Since most recent SEA algorithms use partitions to improve filtering efficiency, for example Gaop, Zhu, Yang, and Toivonen, many 16×16 and 8×8 blocks will be evaluated using smaller partitions. When combined with the rate-constrained search ordering algorithm method, these algorithms will lead to an overall increase in the reduction of SAD operations.

Tables 1 and 2 show that the rate-constrained search ordering algorithm method is, on average, more efficient with sequences that contain important and unpredictable movement ("Foreman", "Football"), as compared to more predictable sequences. An increase in motion vector size leads to an increase in the ratio between the number of bits required to encode motion vectors and the SAD values. More nonzero motion vectors will cause an increase in the probability of weakening the filtering criterion (choosing a candidate on or near the diagonal).

Embodiments of the invention will now be described with reference to the drawings.

Figure 1:
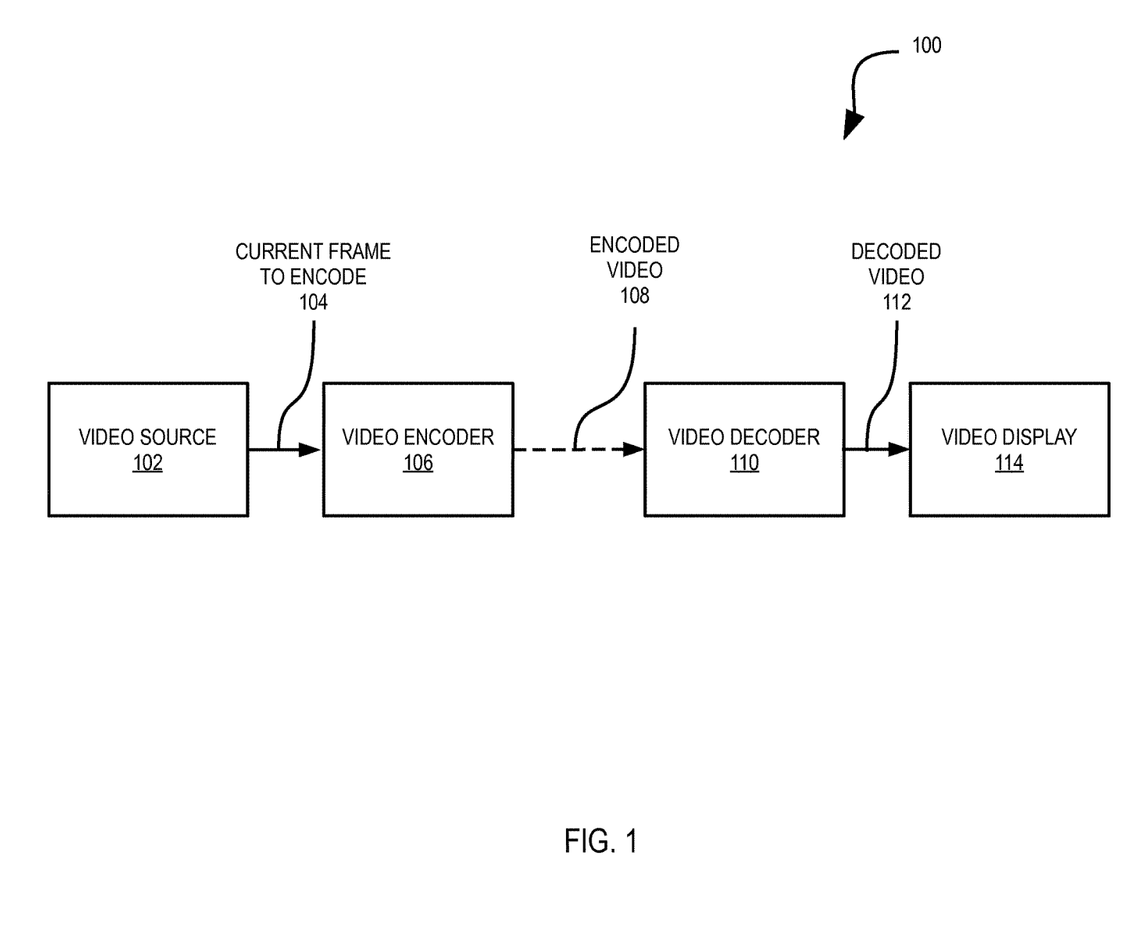
FIG. 1 is a block diagram of a video system in accordance with an embodiment of the invention.

Referring to FIG. 1, there is shown an embodiment of a video system 100 in accordance with embodiments of the invention. The video system 100 includes a video source 102 for providing a current frame to encode (an un-encoded video frame) 104 for encoding by a video encoder 106. The video source 102 may be a camera or any other video source known in the art. The video encoder 106 encodes the un-encoded video frames 104 to provide encoded video 108 in accordance with methods and systems of embodiments of the invention as described in detail herein below. The video system 100 further includes a transmission medium (not shown) for transmitting the encoded video 108 to a destination. The transmission medium may be, for example, a cable, wireless network, or storage device such as a digital video disk. A destination video decoder 110 receives the encoded video 108 and decodes the encoded video in a conventional manner to provide decoded video 112. A video display 114 such as a computer screen, television, or screen of a mobile device displays a video corresponding to the video source 102.

Figure 2:
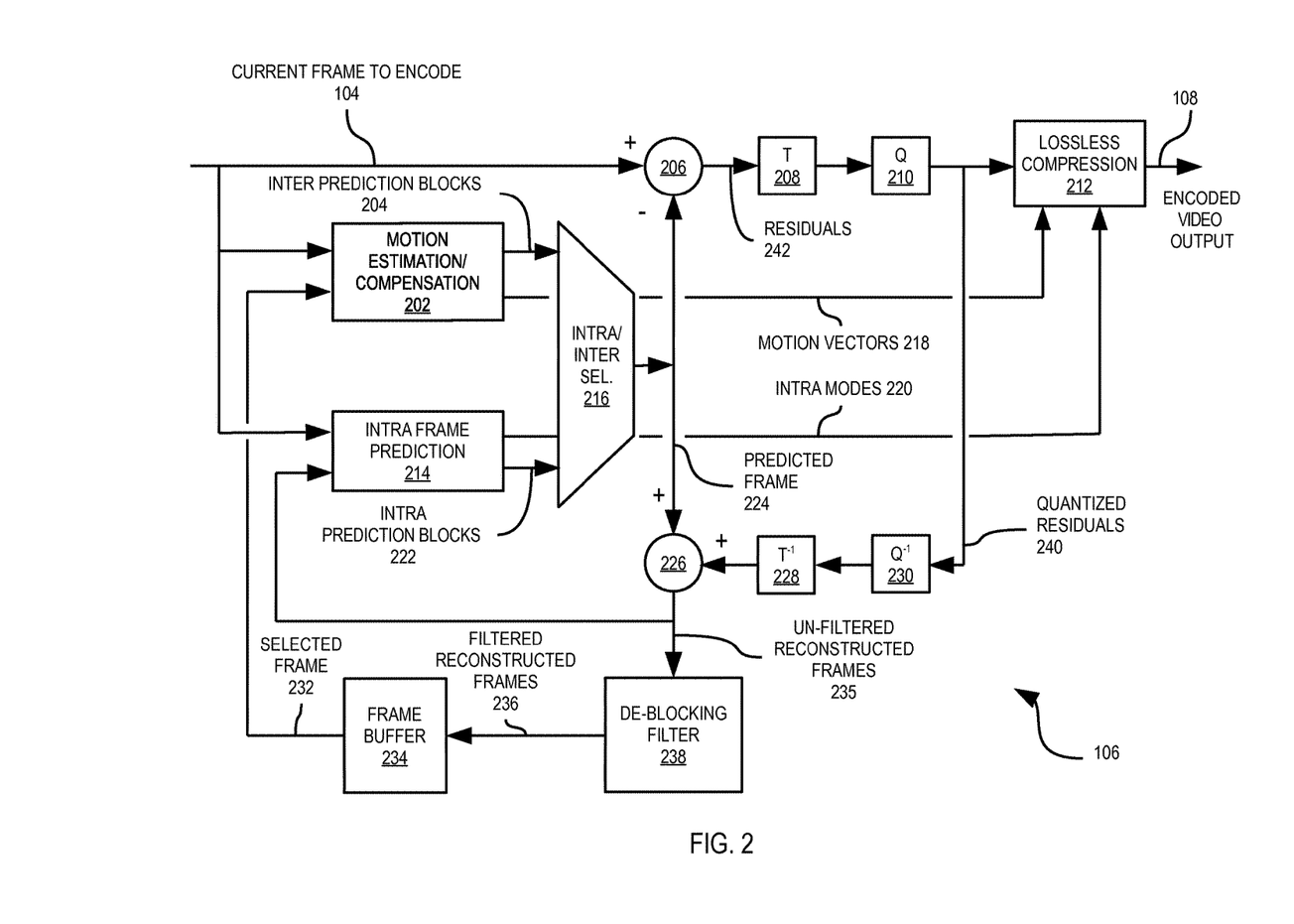
FIG. 2 is a block diagram of a video encoder shown in FIG. 1.

Referring next to FIG. 2 there is shown a block diagram of the video encoder 106 shown in FIG. 1.

The video encoder 106 uses two kinds of predictions: intra prediction 214 (generated from pixels already encoded in the current frame 104) and inter prediction block 222 (generated from pixels encoded in the selected frame 232).

A residual 242 is calculated by performing the difference 206 between the current frame 104 and a predicted frame 224. The predicted frame 224 is selected by an Intra/Inter selector 216 applied on each block of an image based on minimizing the energy of the residual 242, thus constructing a predicted frame 224.

A linear transform 208 is applied to the residual 242. The residual 242 resulting from the transformations 208 are then quantized 210 thus providing a quantized residual 240.

Inverse quantization 230 and inverse transform 228 are applied to the quantized residual 240. The result is added to the predicted frame 224, thus providing an unfiltered reconstructed frame 235. A de-blocking filter 238 is applied to the unfiltered reconstructed frames 235 to reduce compression artifacts. A filtered reconstructed frame 236 is stored in a frame buffer 234 for use in a motion estimation/compensation module 202. An intra-prediction block 222 is generated from the unfiltered reconstructed frame 235, while an inter prediction block 204 is generated from a selected filtered reconstructed frame 232.

The motion estimation/compensation module 202 is described in detail herein below. The motion estimation/compensation module 202 receives the un-encoded video including a current frame to encode 104 from the video source 102 and a selected frame 232 from a frame buffer 234. The motion estimation/compensation module 202 provides an inter prediction block 204 and motion vectors 218.

The quantized residuals 240, motion vectors 218 (including the associated inter modes), and intra modes 220 are combined in a lossless compression module 212 to provide the encoded video output 108.

Figure 3:
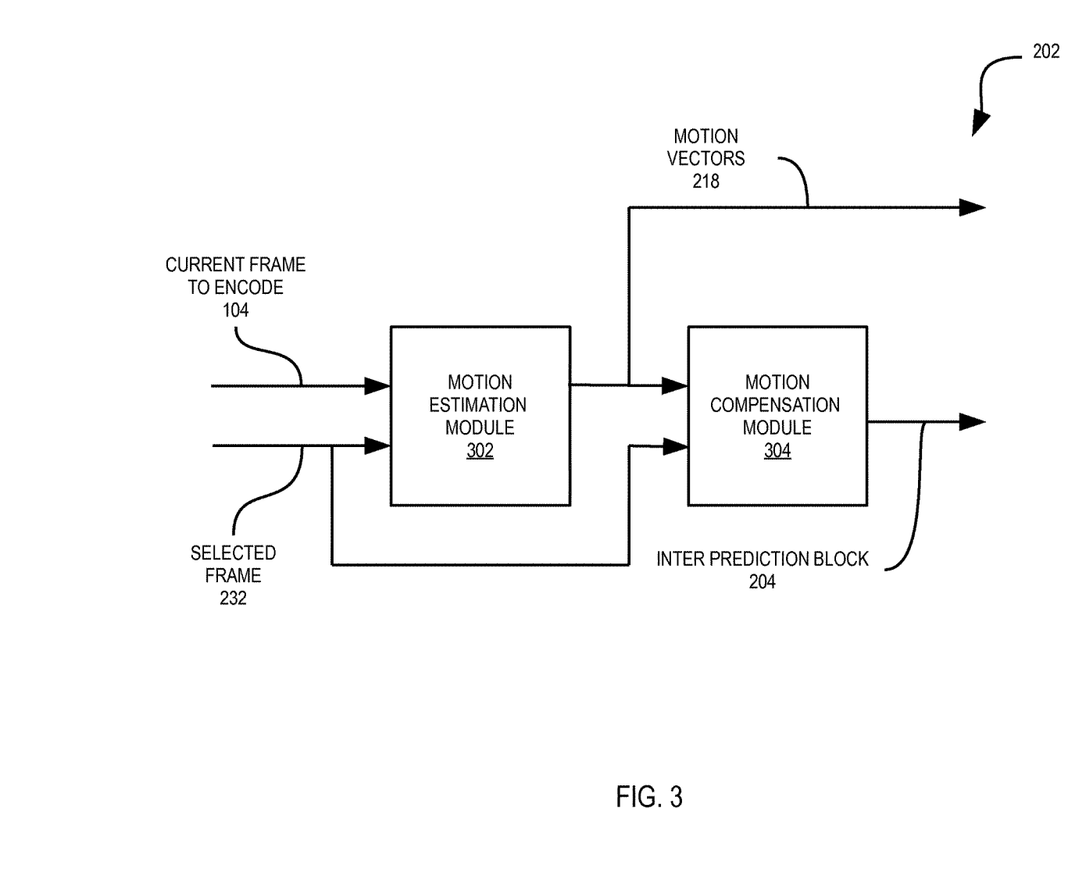
FIG. 3 is a block diagram of a motion estimation/compensation module shown in FIG. 2.

Next, referring to FIG. 3, the motion estimation/compensation module 202 includes a motion estimation module 302 for receiving the current frame to encode 104 and the selected frame 232 and providing the motion vectors 218. The motion estimation module 302 is described in further detail herein below. A motion compensation module 304 receives the selected frame 232 and motion vectors 218 to produce the inter prediction block 204.

Figure 4:
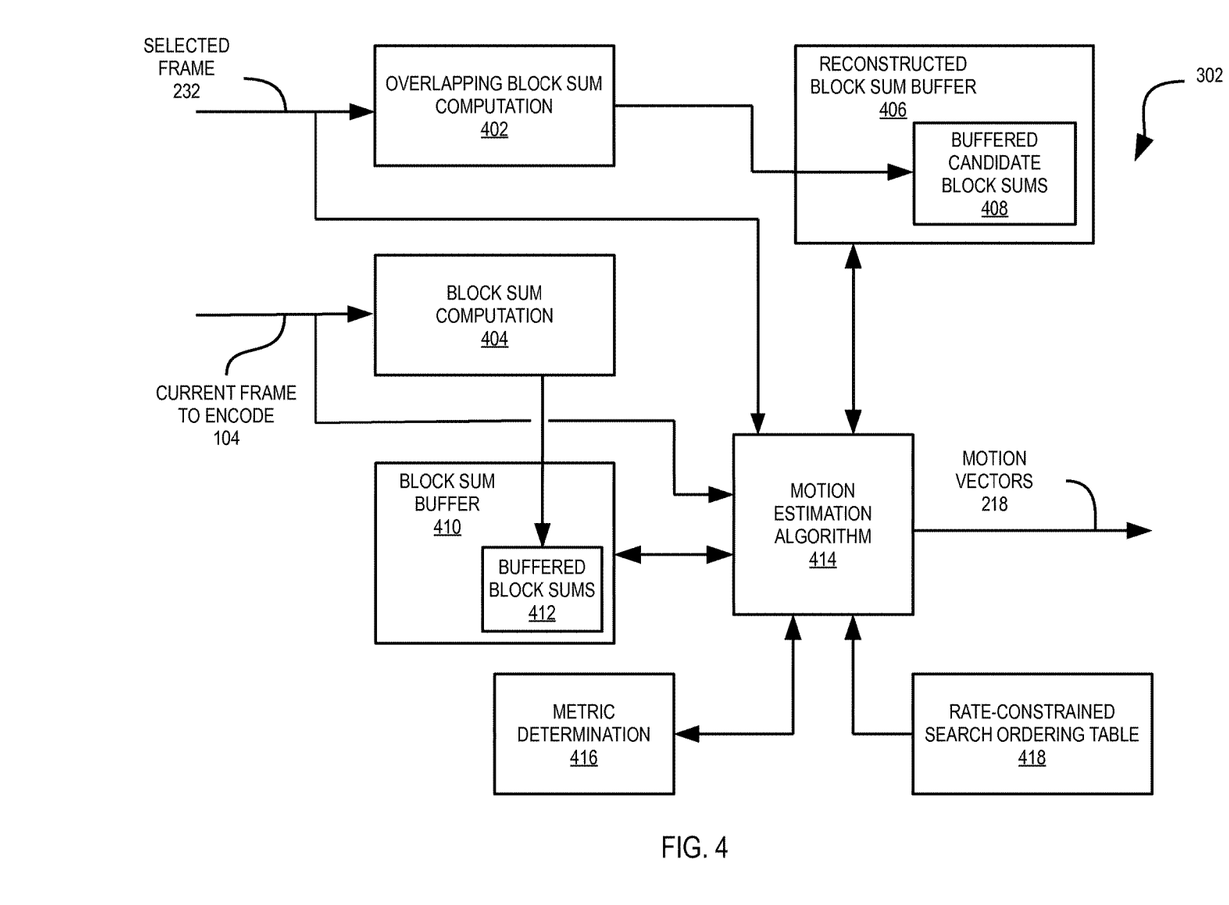
FIG. 4 is a block diagram of a motion estimation module shown in FIG. 3.

FIG. 4 shows a block diagram of the motion estimation module 302 shown in FIG. 3. The motion estimation module 302 includes a selected frame overlapping block sum computation module 402 for computing a sum of pixel values for each block in the selected frame 232.

The motion estimation module 302 further includes a current frame block sum computation module 404 for computing a sum of pixel values for each block in the current frame 104.

The motion estimation module 302 still further includes a reconstructed block sum buffer 406 for holding the block sums of reconstructed frames. The reconstructed block sum buffer 406 includes a plurality of buffered candidate block sums 408 corresponding to one block sum for each possible candidate block.

The motion estimation module 302 further includes a block sum buffer 410. The block sum buffer 410 holds the block sums 412 of frames to encode corresponding to one block sum for each non overlapping block in the current frame to encode 104. Note that block sum buffers 410 and 406 contain buffered block sums 412 and 408 for all the block partitions sizes that are taken into consideration in the motion estimation process (e.g. 16×16, 16×8, 8×16, 8×8, 8×4, 4×8, 4×4). The motion estimation process is performed for these various partition sizes, which arrangement is called a mode. The identification of the best coding mode is performed in the usual manner. The current document focuses on the identification of the best motion vector for a specific block partitions size.

The motion estimation module 302 further includes a metric determination module 416 for computing a cost of candidates, either the sum of absolute difference (SAD) or the absolute difference of sums (ADS). These values are combined with the motion vector cost in order to produce a rate-constrained cost. In a general system, the metric determination module 416 will be able to evaluate two costs, a low complexity cost such as the ADS for filtering purposes and a higher complexity cost, the actual cost of interest, to identify the optimal candidate (or motion vector). But although rate-constrained ADS and SAD were used respectively for this purpose, other costs could be used as well to produce other rate-constrained costs. For instance the sum of absolute transformed differences (SATD) or the sum of squared errors (SSE) could replace the SAD and other metrics can replace the ADS as long as the relationship of equation (1) is met.

Figure 5A:
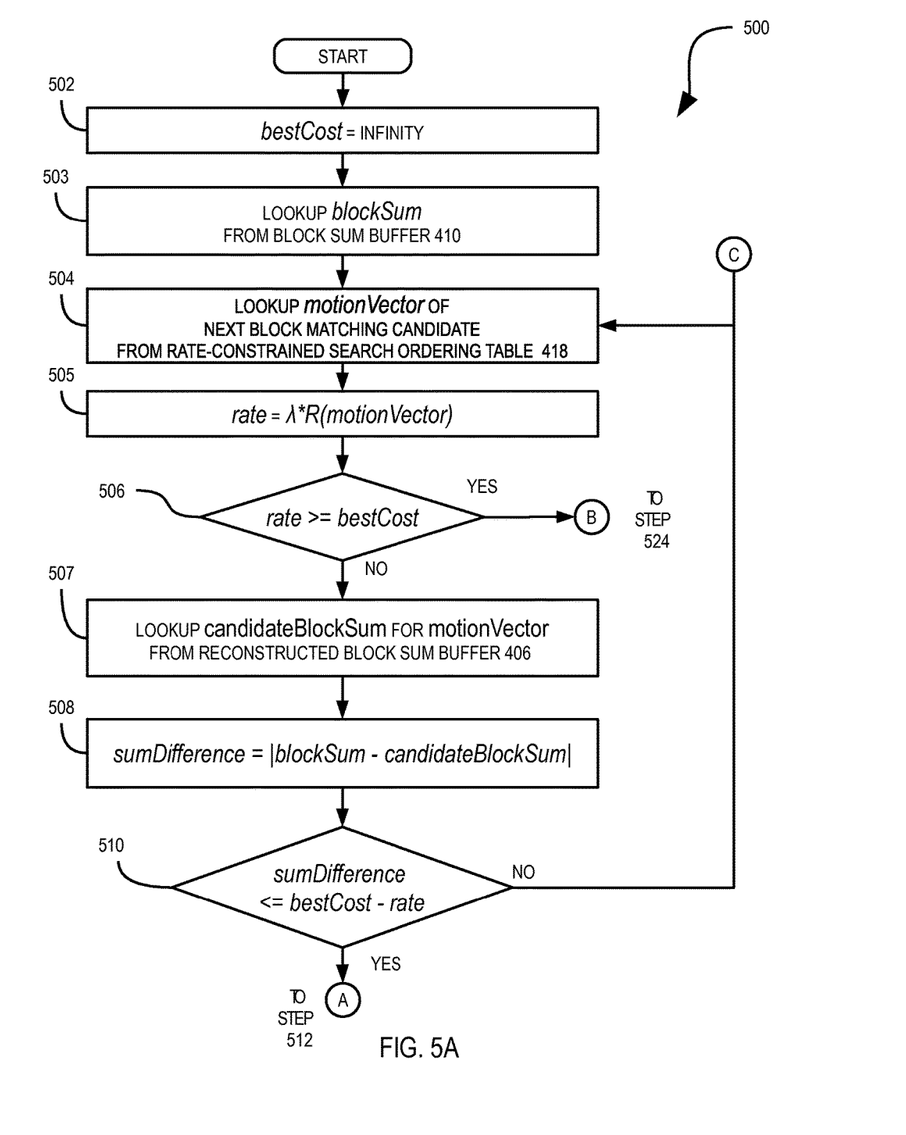
FIGS. 5A and 5B show a flowchart of a method of motion estimation in accordance with an embodiment of the invention.
Figure 5B:
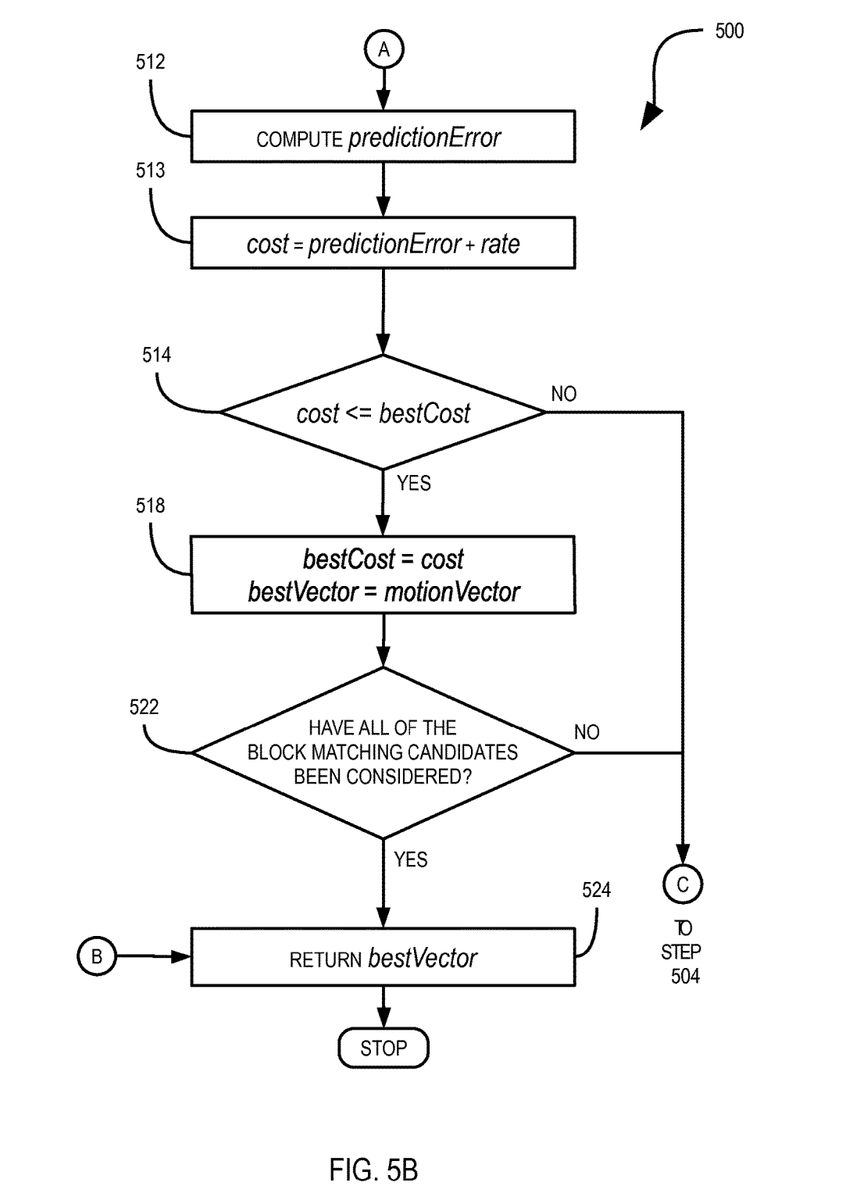

Next, a motion estimation module 414 will be described with reference to the flowchart 500 shown in FIGS. 5A and 5B.

Starting by setting 502 a variable bestCost to infinity then looking up 503 a corresponding blockSum 412 from the block sum buffer 410. Then motionVector of a next block matching candidate is looked up 504 from the rate-constrained search ordering table 418. The rate-constrained search ordering table 418 is described in further detail herein below. Then a rate is calculated 505 as $\lambda^* R(\text{motionVector})$.

Provided the rate is not greater than or equal to 506 the bestCost, the method proceeds to lookup 507 a candidateBlockSum for the motionVector, from the reconstructed block sum buffer 406. Otherwise, provided the rateCost is greater than 506 the bestCost, the method proceeds to step 524 described herein below.

After step 507, sumDifference is calculated 508 as an absolute value of the blockSum minus the candidateBlockSum. Then, provided the sumDifference is less than or equal to 510 the bestCost minus the rate, the method continues to compute 512 predictionError. Otherwise, the method returns to step 504.

After step 512 the method then assigns 513 cost to equal the predictionError plus the rate.

Then provided cost is less than or equal to bestCost, the method continues to assign 518 bestCost equal to cost and bestVector equal to motionVector. Otherwise the method returns to step 504.

Provided that all of block matching candidates have been considered the method is finished searching 522 and the method proceeds to return 524 bestVector. Otherwise the method returns to step 504.

Figure 6:
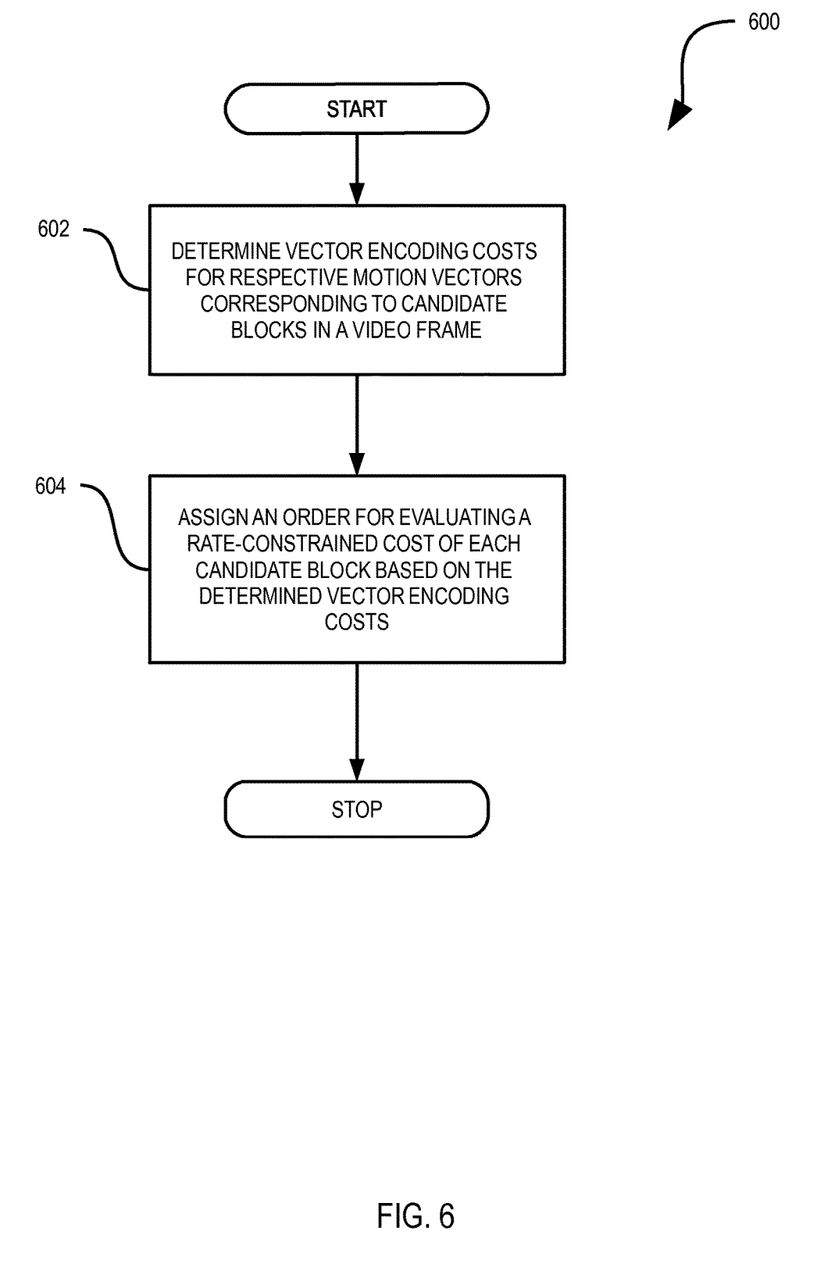
FIG. 6 is a flowchart of a method for determining a series of search positions accordance with an embodiment of invention.

Next the rate-constrained search ordering table 418 will be described with reference to the flowchart of FIG. 6. In order to construct the rate-constrained search ordering table 418, determine 602 vector encoding costs, for respective motion vectors corresponding to candidate blocks in a video frame; and then assign 604 an order for evaluating a rate-constrained cost of each candidate block based on the determined vector encoding costs. The rate-constrained search ordering table 418 may be realized using any type of suitable data structure having the assigned order such as a series, grid, database, or dictionary for example. An example rate-constrained search ordering table is shown in FIG. 8C and described herein above. Note that the rate-constrained search ordering table 418 is precomputed only once.

In preferred embodiments, each search position in the series of search positions has a corresponding vector encoding cost greater than or equal to a previous search position in the series of search positions as described herein above regarding equations (7), (8), and (9).

In other preferred embodiments, the determining the series of search positions further includes determining a section of the rate-constraint search ordering data structure for each of the candidate blocks, and determining the order of the series of search positions according to a respective section of each of the candidate blocks. Preferably, each section of the rate-constraint search ordering data structure is a quadrant. However in general, a section is a segmentation of the candidate space permitting to determine a preferred scan order for candidates having the same vector encoding rate cost. For instance, segmenting into quadrants leads to scan orders such as scanning candidates by alternating quadrants.

In some other preferred embodiments, determining the order of the series of search positions comprises determining a search order that alternates between the quadrants.

Preferably, determining the vector encoding costs of each respective motion vector comprises determining a number of bits required to code components of respective motion vectors.

Preferably, determining the number of bits required to code components of the respective motion vectors comprises determining the number of bits using an exponential code.

In some preferred embodiments, the exponential code is an exponential Golomb code.

In some preferred embodiments an estimate of the bits required to code components of the motion vectors is used.

Figure 9:
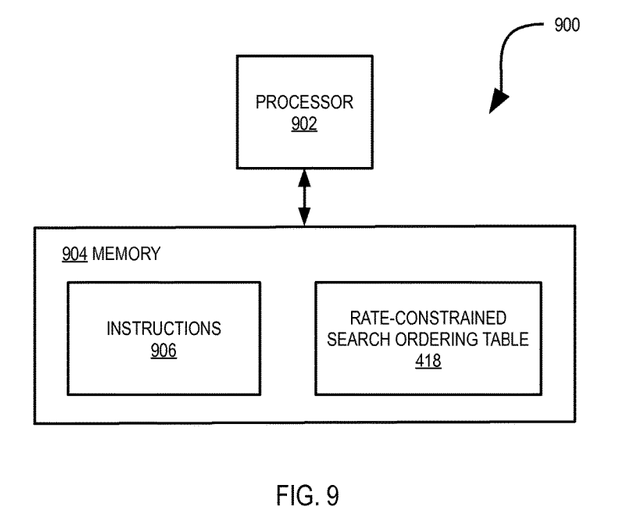
FIG. 9 is a block diagram of a system in accordance with an embodiment of the invention.

Referring to FIG. 9 there is shown a system 900 in accordance with embodiments of the invention. Any of the methods described herein above with reference to the flowchart 600 of FIG. 6 may be implemented using the system 900 for providing the Rate-constrained search ordering table 418. The system 900 includes a computer readable storage medium or memory 902 having computer readable instructions 906 stored thereon for execution by a processor 902 for providing the Rate-constrained search ordering data structure, for example table 418.

In general, embodiments of the invention provide systems and methods for rate-constrained search ordering of candidate blocks in a motion estimation process of a video encoder, including: determining vector encoding costs for respective motion vectors corresponding to candidate blocks in a video frame; and assigning an order for evaluating a rate-constrained cost of each candidate block based on the determined vector encoding costs.

A candidate block search ordering algorithm, herein referred to as a rate-constrained search ordering algorithm, has been provided to eliminate the weakening of the filtering criterion by candidate block search orderings that do not take into consideration the impact of the rate-constraint. Thus, an improved method and system for encoding video images has been provided. For the H.264/AVC JM reference software, changing the candidate block ordering requires few implementation considerations, and can reduce the number of SAD operations required for motion estimation with negligible impact on bit rate and visual quality. The method is also applicable to HEVC where, as mentioned earlier, the bit length of the exponential Golomb code is recommended as a fast estimate of the motion vector cost for the rate-constrained motion estimation algorithm.

Although the embodiments of the invention have been described in detail, it will be apparent to one skilled in the art that variations and modifications to the embodiment may be made within the scope of the following claims.

TABLE OF ELEMENTS

| | |
|---|---|
| 100 | Block diagram of an example video system |
| 102 | Video source |
| 104 | Current frame to encode |
| 106 | Video encoder |
| 108 | Encoded video |
| 110 | Video decoder |
| 112 | Decoded video |
| 114 | Video display |
| 202 | Motion estimation/compensation module |
| 204 | Inter prediction block |
| 206 | Difference frame |
| 208 | Forward transform |
| 210 | Quantization |
| 212 | Lossless compression |
| 214 | Intra frame prediction |
| 216 | Intra/Inter block selector |
| 218 | Motion vectors |
| 220 | Intra modes |
| 222 | Intra prediction block |
| 224 | Predicted frame |
| 226 | Sum frame |
| 228 | Inverse transform |
| 230 | Inverse quantization |
| 232 | Selected frame |
| 234 | Frame buffer |
| 235 | Unfiltered reconstructed frames |
| 236 | Filtered reconstructed frames |
| 238 | De-blocking filter |
| 240 | Quantized residuals |
| 302 | Motion estimation module |
| 304 | Motion compensation module |
| 402 | Selected frame overlapping block sum computation |
| 404 | Current frame block sum computation |
| 406 | Reconstructed block sum buffer |
| 408 | Buffered candidate block sum |
| 410 | Block sum buffer |
| 412 | Buffered block sums |
| 414 | Motion estimation algorithm module |
| 416 | Metric determination |
| 418 | Rate-constrained search ordering table |
| 500 to 524 | Flowchart of a method of motion estimation |
| 600 to 604 | Flowchart of a method for determining a series of search positions |
| 700 | Block diagram of a grid of motion vector bit lengths |
| 802 | Block diagram of a grid of raster search ordering |
| 804 | Block diagram of a grid of H.264 spiral search ordering |
| 806 | Block diagram of a grid of rate-constrained search ordering |
| 900 | Block diagram of a system |
| 902 | Processor |
| 904 | Memory |
| 906 | Computer readable instructions |

The invention claimed is:

1. A method for rate-constrained search ordering of candidate blocks in a motion estimation process of a video encoder, comprising:
   determining vector encoding costs for respective motion vectors corresponding to candidate blocks in a video frame; and
   assigning an order for evaluating a rate-constrained cost of each candidate block based on the determined vector encoding costs.

2. The method as claimed in claim 1, further comprising determining a series of search positions for the candidate blocks in a rate-constrained search ordering data structure, having the assigned order.

3. The method as claimed in claim 2 wherein each search position in the series of search positions has a corresponding vector encoding cost greater than or equal to a previous search position in the series of search positions.

4. The method as claimed in claim 2, wherein the rate-constrained search ordering data structure is a table.

5. The method as claimed in claim 2 wherein the determining the series of search positions further comprises:

determining a section of the rate-constrained search ordering data structure for each of the candidate blocks; and determining the order of the series of search positions according to a respective section of each of the candidate blocks.

6. The method as claimed in claim 5 wherein each section of the rate-constrained search ordering data structure is a quadrant.

7. The method as claimed in claim 6 wherein the determining the order of the series of search positions comprises determining a search order that alternate between the quadrants.

8. The method as claimed in claim 1 wherein the determining the vector encoding costs of each respective motion vector comprises determining a number of bits required to code components of respective motion vectors.

9. The method as claimed in claim 8, wherein the determining the number of bits required to code components of the respective motion vectors comprises determining the number of bits using a variable length code.

10. The method as claimed in claim 9 wherein the variable length code is an exponential code.

11. A system for rate-constrained search ordering of candidate blocks in a motion estimation process of a video encoder, the system comprising:
   a computer readable storage medium having computer readable instructions stored thereon for execution by a processor, causing the processor to:
      determine vector encoding costs for respective motion vectors corresponding to candidate blocks in a video frame; and
      assign an order for evaluating a rate-constrained cost of each candidate block based on the determined vector encoding costs.

12. The system as claimed in claim 11 wherein the computer readable instructions further cause to processor to determine a series of search positions for the candidate blocks in a rate-constrained search ordering data structure, having the assigned order.

13. The system as claimed in claim 12 wherein each search position in the series of search positions has a corresponding vector encoding cost greater than or equal to a previous search position in the series of search positions.

14. The system as claimed in claim 12 wherein the rate-constrained search ordering data structure is a table.

15. The system as claimed in claim 12 wherein the computer readable instructions that cause to processor to determine the series of search positions further comprises computer readable instructions that cause to processor to:
   determine a section of the rate-constrained search ordering data structure for each of the candidate blocks; and
   determine the order of the series of search positions according to a respective section of each of the candidate blocks.

16. The system as claimed in claim 15 wherein each section of the rate-constrained search ordering data structure is a quadrant.

17. The system as claimed in claim 16 wherein the computer readable instructions that cause the processor to determine the order of the series of search positions comprises computer readable instructions that cause the processor to determine a search order that alternates between the quadrants.

18. The system as claimed in claim 11 wherein the computer readable instructions that cause the processor to determine the vector encoding costs of each respective motion vector comprises computer readable instructions that cause the processor to determine a number of bits required to code components of respective motion vectors.

19. The system as claimed in claim 18, wherein the computer readable instructions that cause the processor to determine the number of bits required to code components of the respective motion vectors comprises computer readable instructions that cause the processor to determine the number of bits using a variable length code.

20. The system as claimed in claim 19 wherein the variable length code is an exponential code.

* * * * *